(12) United States Patent  (10) Patent No.: US 9,227,186 B2
Kanatzidis et al.  (45) Date of Patent: Jan. 5, 2016

(54) SYNTHESIS OF LAYERED METAL SULFIDE ION-EXCHANGERS

(71) Applicant: Northwestern University, Evanston, IL (US)

(72) Inventors: Mercouri G. Kanatzidis, Wilmette, IL (US); Zohreh Hassanzadeh Fard, Evanston, IL (US)

(73) Assignee: Northwestern University, Evanston, IL (US)

(*) Notice: Subject to any disclaimer, the term of this patent is extended or adjusted under 35 U.S.C. 154(b) by 106 days.

(21) Appl. No.: 14/044,970

(22) Filed: Oct. 3, 2013

(65) Prior Publication Data

US 2014/0097141 A1 Apr. 10, 2014

Related U.S. Application Data

(60) Provisional application No. 61/709,425, filed on Oct. 4, 2012.

(51) Int. Cl.
*C02F 1/42* (2006.01)
*B01J 39/08* (2006.01)
*B01D 15/36* (2006.01)
*C02F 1/28* (2006.01)

(52) U.S. Cl.
CPC .......... *B01J 39/085* (2013.01); *B01D 15/362* (2013.01); *C02F 1/281* (2013.01); *C02F 1/42* (2013.01)

(58) Field of Classification Search
CPC ................... B01J 39/085; C02F 1/283

USPC ......................................... 210/688
See application file for complete search history.

(56) References Cited

U.S. PATENT DOCUMENTS

| | | | |
|---|---|---|---|
| 4,040,917 A | 8/1977 | Whittingham | |
| 4,159,962 A | 7/1979 | Di Salvo et al. | |
| 4,340,496 A | 7/1982 | Abbott | |
| 5,531,936 A | 7/1996 | Kanatzidis et al. | |
| 6,355,175 B1* | 3/2002 | Green et al. | 210/652 |
| 6,616,860 B1 | 9/2003 | Onodera et al. | |
| 6,919,030 B2* | 7/2005 | Thorpe et al. | 210/665 |
| 8,070,959 B2 | 12/2011 | Kanatzidis et al. | |
| 2003/0200839 A1* | 10/2003 | Jenkins et al. | 75/741 |
| 2008/0145305 A1 | 6/2008 | Kanatzidis et al. | |
| 2009/0095684 A1* | 4/2009 | Kanatzidis et al. | 210/688 |
| 2010/0260659 A1* | 10/2010 | Winter | 423/469 |

(Continued)

FOREIGN PATENT DOCUMENTS

WO  WO2015/080976  6/2015

OTHER PUBLICATIONS

Manos et al., Layered metal sulfides: Exceptionally selective agents for radioactive strontium removal, PNAS, vol. 105, No. 10, Mar. 11, 2008, pp. 3696-3699.*

(Continued)

*Primary Examiner* — Chester Barry
(74) *Attorney, Agent, or Firm* — Bell & Manning, LLC

(57) ABSTRACT

Methods for the synthesis of compounds of the formula $A_{2x}M_xSn_{3-x}S_6$, where x has a value in the range from 0.5 to 1; A is $Li^+$, $Na^+$, $K^+$, or $Rb^+$; and M is $Mg^{2+}$, $Mn^{2+}$, $Zn^{2+}$, or $Fe^{2+}$, are provided. Also provided are methods of remediating fluid samples using the compounds.

6 Claims, 17 Drawing Sheets

(56) References Cited

U.S. PATENT DOCUMENTS

2011/0290735 A1    12/2011    Kanatzidis et al.
2015/0144568 A1    5/2015    Kanatzidis et al.

OTHER PUBLICATIONS

Ding et al., Permeable layers with large windows in $[(CH_3CH_2CH_2)_2NH_2]_5In_5Sb_6S_{19}$-1.45$H_2O$: High ion-exchange capacity, size discrimination, and selectivity for Cs ions, Chem. Mater., vol. 19, Jul. 17, 2007, pp. 3867-3869.

Divigalpitiya et al., Inclusion systems of organic molecules in restacked single-layer molybdenum disulfide, Science, vol. 246, Oct. 20, 1989, pp. 369-371.

Clement et al., Organometallic intercalates of the layered transition-metal dichalcogenides $TaS_2$ and $ZrS_2$, Inorg. Chem., vol. 17, No. 10, American Chemical Society, 1978, pp. 2754-2758.

Heising et al., Exfoliated and restacked $MoS_2$ and $WS_2$: Ionic or neutral species? Encapsulation and ordering of hard electropositive cations., J. Am. Chem. Soc., vol. 121, Dec. 4, 1999, pp. 11720-11732.

Dungey et al., Structural characterization and thermal stability of $MoS_2$ intercalation compounds, Chem. Mater., vol. 10, Jul. 11, 1998, pp. 2152-2161.

Bortun et al., Evaluation of Synthetic Inorganic Ion Exchangers for Cesium and Strontium Removal from Contaminated Groundwater and Wastewater, Solvent Extr. Ion Exch., vol. 15, No. 5, 1997, pp. 909.

Sylvester et al., The Removal of Strontium and Cesium from simulated Hanford Groundwater Using Inorgainc Ion Exchange Materials, Solvent Extr. Ion Exch., vol. 16, No. 6, 1998, pp. 1527.

Bortun et al., Synthesis, Characterization, and Ion Exchange Behavior of a Framework Potassium Titanium Trisilicate $K_2TiSi_3O_9H_2O$ and Its Protonated Phases, Chem. Mater., vol. 12, No. 2, Jan. 13, 2000, pp. 294.

Möller et al., Update of $^{85}Sr$, $^{134}Cs$ and $^{57}Co$ by antimony silicates doped with $Ti^{4+}$, $Nb^{5+}$, $Mo^{6+}$ and $W^{6+}$, J. Mater. Chem., vol. 11, 2001, pp. 1526.

Mercier et al., Access in Mesoporous Materials: Advantages of a Uniform Pore Structure in the Design of a Heavy Metal Ion Adsorbent for Environmental Remediation, Adv. Mater., vol. 9, No. 6, 1997, pp. 500.

Feng et al., Functionalized Monolayers on Ordered Mesoporous Supports, Science, vol. 276, May 9, 1997, pp. 923.

Gash et al., Efficient Recovery of Elemental Mercury from Hg(II)-Contaminated Aqueous Media Using a Redox-Recyclable Ion-Exchange Material, Environ. Sci. Technol., vol. 32, No. 7, 1998, pp. 1007.

International Search Report and Written Opinion issued in PCT/US08/11550, Dec. 12, 2008.

Manos et al., H2xMnxSn3—xS6 (x=0.11-0.25): A Novel Reusable Sorbent for Highly Specific Mercury Capture Under Extreme pH Conditions, Adv. Funct. Mater., vol. 19, 2009, pp. 1087-1092.

Manos et al., Sequestration of Heavy Metals from Water with Layered Metal Sulfides, Chem. Eur. J., vol. 15, 2009, pp. 4779-4784.

Manos et al., Highly Efficient and Rapid Cs+ Uptake by the Layered Metal Sulfide K2xMnxSn3—xS6 (KMS-1), J. Am. Chem. Soc., vol. 131, Apr. 17, 2009, pp. 6599-6607.

Manos et al., Layered Metal Sulfides Capture Uranium from Seawater, J. Am. Chem. Soc., vol. 134, Sep. 25, 2012, pp. 16441-16446.

Mertz et al., Selective Removal of Cs+, Sr2+, and Ni2+ by K2xMgxSn3—xS6 (x = 0.5-1) (KMS-2) Relevant to Nuclear Waste Remediation, Chem. Mater., vol. 25, May 15, 2013, pp. 2116-2127.

International Search Report and Written Opinion issued in PCT Application No. PCT/US2014/066882, Mar. 16, 2015.

\* cited by examiner

SYNTHESIS OF LAYERED METAL SULFIDE ION-EXCHANGERS

CROSS-REFERENCE TO RELATED APPLICATION

The present application claims priority to U.S. provisional patent application No. 61/709,425 that was filed Oct. 4, 2012, the entire contents of which is hereby incorporated by reference.

BACKGROUND

Metal chalcogenide-based ion exchangers are layered structures with loosely bound interlayer cations. The presence of the soft chalcogen ligands in these materials can induce innate selectivity for heavier metal ions and against hard ions. However, layered chalcogenides with ion exchange properties are scarce. Examples include ion-exchangers of the formula $A_{2x}M_xSn_{3-x}S_6$. However, the conventional synthetic methods for the isolation of these compounds are not cost-effective. For example, these compounds have been made using alkali metal poly sulfides via the reaction of $A_2S$ and S where $A_2S$ is synthesized in liquid ammonia. Unfortunately, that method requires expensive chemicals and equipment.

SUMMARY

Methods for the synthesis of compounds of the formula $A_{2x}M_xSn_{3-x}S_6$, where x has a value in the range from 0.5 to 1 (including, for example, x values in the range from 0.5 to 0.95); A is $Li^+$, $Na^+$, $Rb^+$, or $Cs^+$; M is $Mg^{2+}$, $Ca^{2+}$, $Mn^{2+}$, $Zn^{2+}$, or $Fe^{2+}$, are provided. Also provided are methods of remediating fluid samples using the compounds.

The synthesis can be a solid state synthesis or a hydrothermal synthesis. For example, one embodiment of the present methods is a solid state method comprising heating a reaction mixture comprising, or consisting of, $A_2CO_3$, M, S and Sn to a temperature and for a time sufficient to produce the compound of formula $A_{2x}M_xSn_{3-x}S_6$, via a solid state reaction. In some embodiments, the step of heating the reaction mixture comprises heating the mixture to a temperature of no greater than about 1000° C. (e.g., no greater than about 850° C.) for a time of no greater than about 15 hours. Despite the short reaction times, the solid state methods are able to provide high product yields of the compound having formula $A_{2x}M_xSn_{3-x}S_6$. For example yields of at least about 50%, at least 60% and at least 65%, based on total mass, are possible with reaction times of 15 hours or fewer.

Another embodiment of the present methods is a hydrothermal method comprising heating a reaction mixture of $A_2CO_3$, M, S, Sn and water to a temperature and for a time sufficient to produce the compound of formula $A_{2x}M_xSn_{3-x}S_6$, via a hydrothermal reaction. In some embodiments, the step of heating the reaction mixture comprises heating the mixture to a temperature of no greater than about 250° C. (e.g., no greater than about 220° C.) for a time of no greater than about 5 hours. Despite the low reaction temperatures and the short reaction times, the hydrothermal methods are able to provide high product yields of the compound having formula $A_{2x}M_xSn_{3-x}S_6$. For example yields of at least about 70%, at least 80% and at least 95%, based on total mass, are possible with reaction times of 5 hours or fewer and reaction temperatures of 250° C. or lower.

Also provided are methods for the remediation of fluid samples using the chalcogenides. The methods comprise exposing a fluid sample comprising metal ions to an ion exchange medium comprising a chalcogenide compound having the formula $A_{2x}M_xSn_{3-x}S_6$, where x has a value in the range from 0.5 to 0.95; A is $Li^+$, $Na^+$, $K^+$, $Rb^+$, or $Cs^+$; and M is $Mg^{2+}$, $Ca^{2+}$, $Mn^{2+}$, $Zn^{2+}$, or $Fe^{2+}$. In the methods, the chalcogenide compounds absorb the metal, which can then be removed from the fluid sample.

The chalcogenide compounds can be used to remove a variety of metal ions from a fluid (e.g., liquid or gas) sample, including ions of metals that pose an environmental and/or health risk. Thus, examples of fluid samples that can be remediated by the present methods include, waste water generated from a nuclear reactor, an industrial plant or from mining processes, such as ore leaching. Examples of metal ions that can removed from the liquid samples include $Cr^{6+}$, $Nd^{3+}$, $As^{3+}$, $As^{5+}$, $Se^{4+}$, and $Se^{6+}$ ions. In addition, the chalcogenide compounds can be used to remove elemental metals, such as mercury or silver, from a fluid sample, such as a sample obtained from an ore leaching process, that comprises cyanide complexes, such as $K_2Hg(CN)_4$ and $KAg(CN)_2$.

DETAILED DESCRIPTION

Figure 1B:
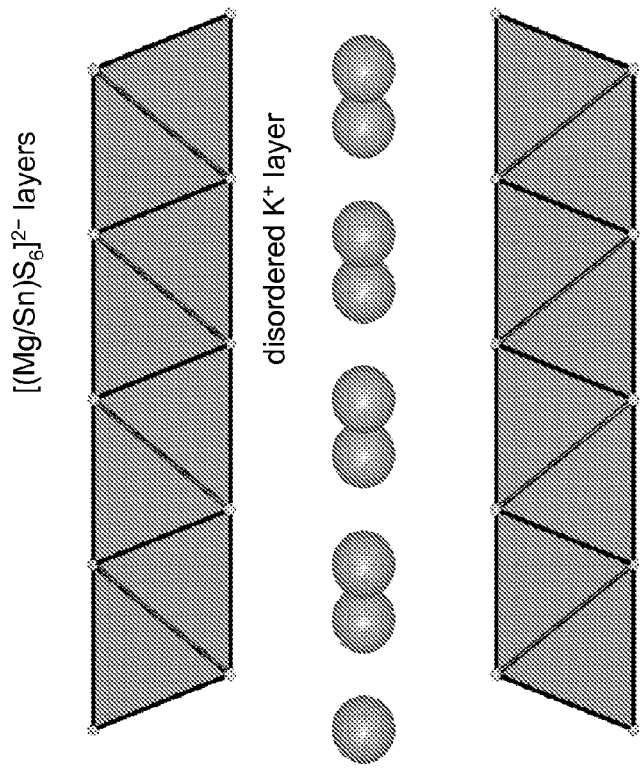
FIG. 1(B). The layers of FIG. 1(A) represented in polyhedral form, showing the potassium ions that lie (disordered) between the layers.

Herein, we describe the layered metal sulfide materials of the general formula $A_{2x}M_xSn_{3-x}S_6$ (x=0.5-0.95; A=Li$^+$, Na$^+$, K$^+$, Rb$^+$; M=Mg$^{2+}$, Ca$^{2+}$, Mn$^{2+}$, Zn$^{2+}$, Fe$^{2+}$). These materials made of inexpensive, non-toxic elements that can be easily prepared on a large scale and high purity with solid-state or hydrothermal synthesis techniques and are extremely stable in air atmosphere and water, while they display high thermal stability. The layered metal sulfide materials expressed herein represent bona fide examples of chalcogenide compounds with a clay-like cation-exchange capacity. The layered metal sulfide materials embodied herein exhibit facile and highly selective ion-exchange properties for cations of great environmental concern such as Cs$^+$ and Sr$^{2+}$; the radioactive isotopes of which are the major contaminants in the fission product of nuclear wastes. The layered metal sulfide materials embodied herein are also extremely capable to clean the water from soft heavy metal ions (e.g. Hg$^{2+}$, Pb$^{2+}$, Cd$^{2+}$, Ag$^+$), which constitute a serious health threat for humans and other species. The layered metal sulfide materials exemplified herein are also capable to partially remove Cr$^{6+}$ and Nd$^{3+}$ which have chronic effects on the human body. The layered metal sulfide materials embodied herein are also capable to partially remove arsenic and selenium that are typically present in water in the soluble forms of arsenite, arsenate, selenite, and selenate. The layered metal sulfide materials embodied herein can be successfully used to efficiently uptake Ag$^+$ and Hg$^{2+}$ ions from their water soluble cyanide complexes that are produced during the oar leaching process using cyanidation technology, and elemental Ag can be recovered from the Ag$^+$ and Hg$^{2+}$-loaded compound.

Clays and zeolites are characteristic examples of inorganic ion exchange materials. Metal chalcogenides with layered structures and loosely bound interlayer cations could also exhibit similar properties to oxides but with unique attributes. The presence of the soft chalcogen ligands can induce to them innate selectivity for soft (or relatively soft) metal ions such as Cs$^+$, Sr$^{2+}$, or heavy metal ions such as Hg$^{2+}$, Pb$^{2+}$, Cd$^{2+}$ and Ag$^+$, and against hard ions such as Na$^{2+}$ or Ca$^{2+}$, a property which could be particularly useful for ion discriminations in nuclear wastes or wastewater with heavy metal ion contaminants.

Layered chalcogenides with ion exchange properties remain scarce. Materials that are known, are mainly limited to alkali ion-intercalated transition metal dichalcogenides $A_xMQ_2$ (A=alkali metal ion; M=early transition metal, Q=S, Se, Te). However, such materials are not suitable for practical applications as ion exchangers, due to their thermodynamic and hydrolytic instability.

The main advantages of materials such as $A_{2x}M_xSn_{3-x}S_6$ (x=0.5-0.95; A=Li$^+$, Na$^+$, K$^+$, Rb$^+$; M=Mg$^{2+}$, Mn$^{2+}$, Zn$^{2+}$, Fe$^{2+}$) materials against known adsorbents may include one or more of the following:

a) they constitute unique examples of universal ion exchangers. For example, only one material $K_{2x}Mg_xSn_{3-x}S_6$ (x=0.5-0.95) may be highly effective in various remediation processes that usually need two or more different materials and this can be very important from the economical point of view.

Clays, zeolites and titanosilicates are excellent adsorbents for cesium and strontium, but they display low selectivity and binding affinity for mercury;

b) they display remarkable selectivity for Cs$^+$ and Sr$^{2+}$ over hard ions like Na$^+$ or H$^+$. They are also rare examples of inorganic ion exchangers with significant exchange capacity for Sr$^{2+}$ in acidic environment;

c) they can be prepared with a low cost and environmental friendly synthetic procedure and they are remarkably stable in water and air. They display high exchange capacity for a variety of soft heavy metal ions such as Hg$^{2+}$, Pb$^{2+}$, Cd$^{2+}$ and Ag$^+$. Thus, these materials exhibit distinctive advantages over thiol-functionalized adsorbents, which are prepared with a high cost synthesis (due to the use of expensive organic surfactants, organic solvents and organosilane) and display air/water instability arising from the tendency of the thiol-groups to be oxidized to disulfide ones. In addition, most of thiol-functionalized adsorbents display low adsorption capacity for lead or cadmium;

d) they are also capable to partially remove Cr$^{6+}$ and Nd$^{3+}$ which have chronic effects on the human body;

e) they remove As and Se ions from water in the soluble forms of arsenite, arsenate, selenite, and selenate; and f) they can efficiently extract the metals (e.g. Ag$^+$, Hg$^{2+}$) from the formed cyanide complexes which is one of the long-term issues associated with Ore leaching process using cyanidation technology.

The synthesis of $A_{2x}M_xSn_{3-x}S_6$ materials, where x=0.5-0.95; A=Li$^+$, Na$^+$, K$^+$, Rb$^+$; and M=Mg$^{2+}$, Mn$^{2+}$, Zn$^{2+}$, Fe$^{2+}$, can be achieved with various methods as further described below. From an economical point of view, the most attractive method is the hydrothermal synthesis involving the reaction:

$$3A_2CO_3 + 14S + 2M + 4Sn \rightarrow 2A_2MSn_2S_6 + A_2S_2O_3 + 3CO_2$$

Figure 1A:
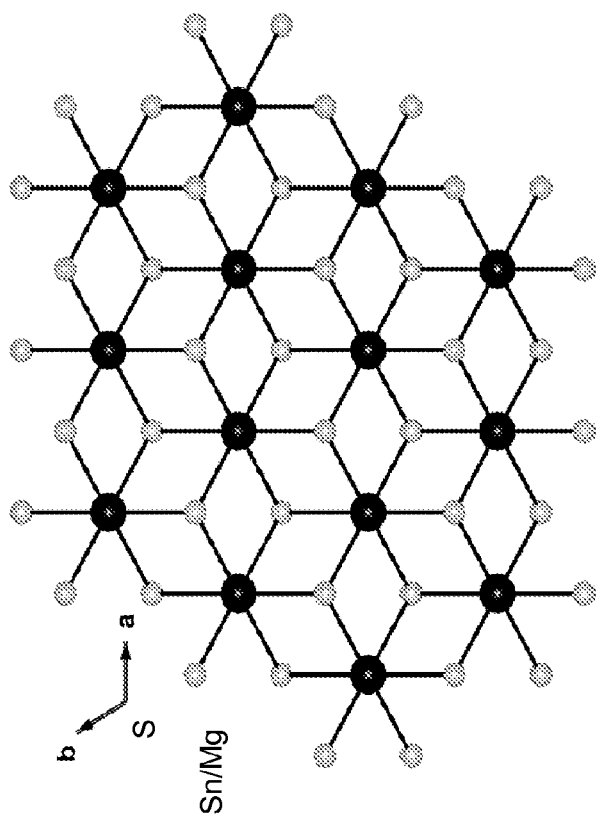
FIG. 1(A). The Sn/Mg substituted layer showing the octahedral coordination of the metal sites and the three coordinate sulfur atoms.

The structure of KMS-2 was solved and refined in the space group P6$_3$/mmc. $K_{2x}Mg_xSn_{3-x}S_6$ (x=0.5-0.95) (KMS-2) has a layered structure (CdI$_2$ type) featuring layers of edge sharing "Sn/Mg"S6 octahedra. The structure is a derivative of the lamellar SnS$_2$ phase featuring a substitution of some of the Sn atoms by magnesium. The substitution creates a negative charge in the framework that is balanced by potassium ions. Each metal center is octahedral, while S atoms are all three coordinate (FIGS. 1(A) and 1(B)).

$A_{2x}M_xSn_{3-x}S_6$ materials may act as ion exchangers. We present here some exemplary test results for the $K_{2x}Mg_xSn_{3-x}S_6$ (x=0.5-0.95, KMS-2) compound (Table 1).

TABLE 1

Selected data for $K_{2x}Mg_xSn_{3-x}S_6$ (x = 0.5-0.95, KMS-2) and its Cs$^+$ and Sr$^{2+}$ exchanged analogues.

| KMS-2 Ion Exchange w/Given Ions | Nominal Composition | Measured Composition | d-spacing of (002) |
|---|---|---|---|
| KMS-2 | $K_2Mg_1Sn_2S_6$ | $K_{1.8}Mg_{0.8}Sn_{2.02}S_{5.8}$ | 8.52 Å |
| Cs$^+$ | $Cs_2Mg_1Sn_2S_6$ | $Cs_{1.6}Mg_{0.9}Sn_{2.02}S_{5.4}$ | 8.99 Å |
| Sr$^{2+}$ | $Sr_1Mg_1Sn_2S_6$ | $Sr_{0.9}Mg_{0.8}Sn_{2.02}S_{5.6}$ | 13.8 Å |

Figure 2:
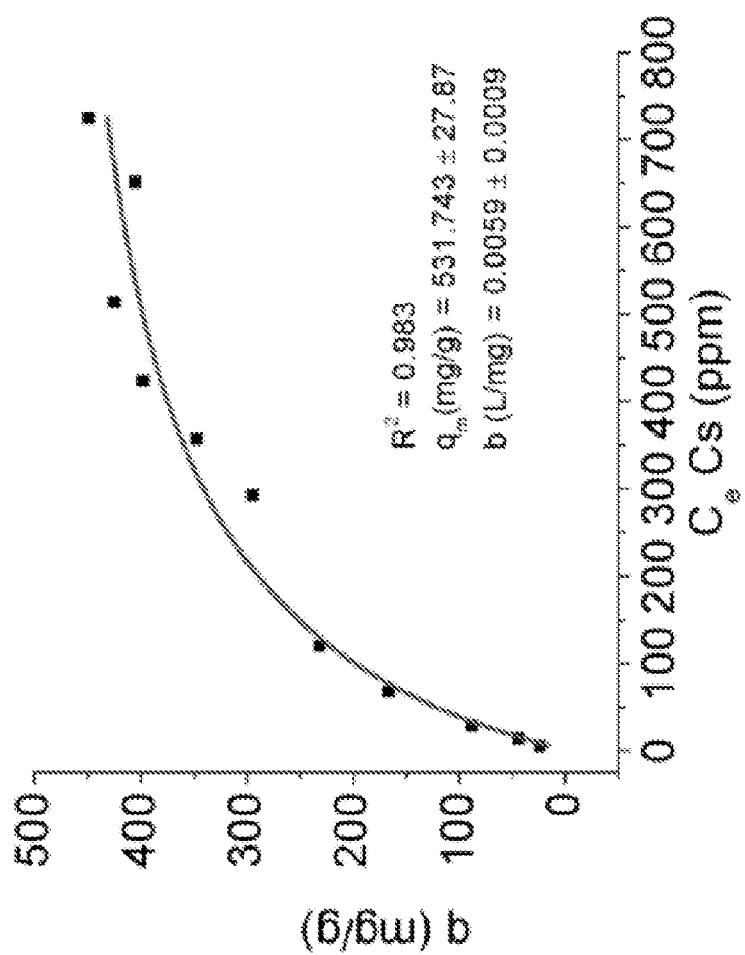
FIG. 2. The $Cs^+$ equilibrium curve for KMS-2. The Langmuir equilibrium isotherm is derived from the $Cs^+$ concentration at equilibrium, plotted against the capacity (mg ions removed/g of sorbent). The data points were fit using the Langmuir model to determine $q_m$ (531.7 mg/g KMS-2). Initial pH ~7, V/m ~1000 mL/g.
Figure 3:
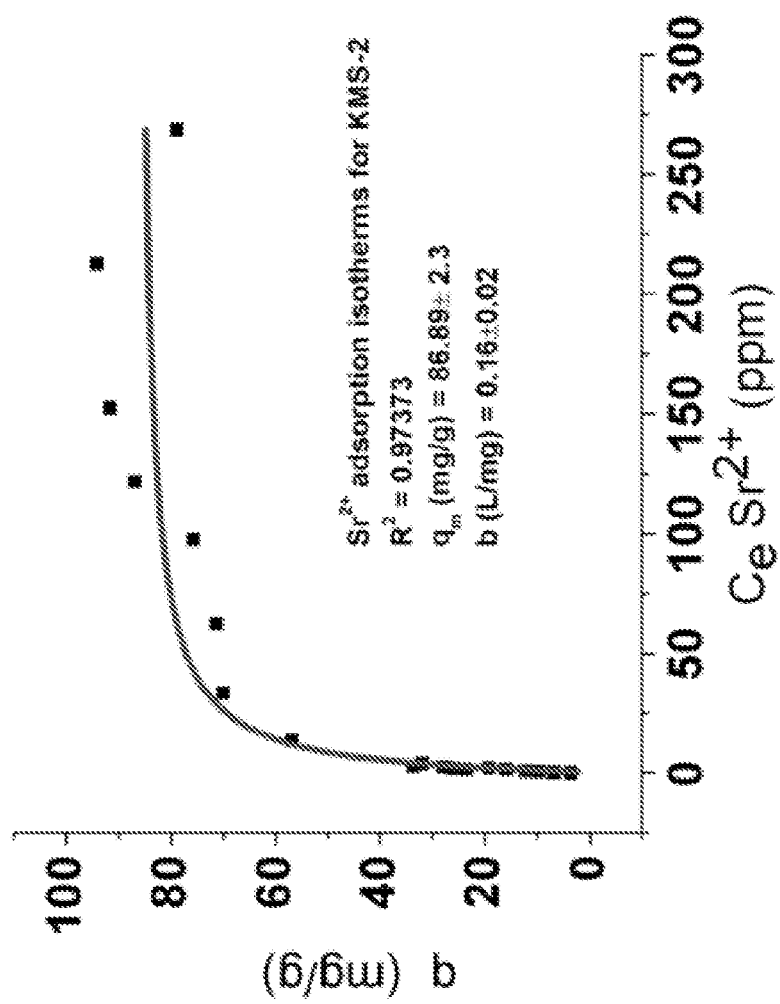
FIG. 3. The $Sr^{2+}$ equilibrium curve for KMS-2. The data points were fit using the Langmuir model to determine $q_m$ (86.89 mg/g KMS-2). Initial pH ~7, V/m ~1000 mL/g.

Cs$^+$ and Sr$^{2+}$-remediation properties of KMS-2 were also tested. The maximum Cs$^+$ exchange capacity (qm) of KMS-2 was found to be 531.7 mg/g (4.00 mmol/g) (FIG. 2). This is 106% of the theoretical capacity for Cs$^+$ (499.3 mg/g or 3.74 mmol/g). The theoretical capacity is calculated assuming that only the K$^+$ ions are exchangeable. Further ion exchange of Mg$^{2+}$ ions from the layers can account for the small excess of Cs$^+$ adsorption observed. Therefore, the qm of KMS-2 is potentially higher than the theoretical maximum capacity, and could be twice as high if we assume that both $K^+$ and $Mg^{2+}$ ions can be exchanged. The maximum $Sr^{2+}$ exchange capacity of KMS-2 was found to be 86.89 mg/g (0.99 mmol/g) (FIG. 3). This is 52% of the theoretical capacity (164.5 mg/g or 1.87 mmol/g). $Sr^{2+}$ often exists in a hydrated form (e.g. $[Sr(H_2O)_6]^{2+}$) and thus has larger volume. Therefore the full stoichiometric number of such ions cannot be accommodated in the interlayer space. The size of the $Sr^{2+}$ interlayer spacing (13.8 Å) is much larger than that of $Cs^+$ (8.99 Å), this additional size constraint in the $Sr^{2+}$ reactions explains why the capacity for $Sr^{2+}$ of KMS-2 is about half of the theoretical. The maximum distribution coefficient $K_d$ value for the $Cs^+$ ion exchange was found $7.1 \times 10^3$ mL/g being well-comparable with those of the most efficient $Cs^+$ ion exchangers. The maximum $K_d$ value for the $Sr^{2+}$ ion exchange was found $2.1 \times 10^4$ mL/g which lies among the highest reported in the literature for $Sr^{2+}$ adsorbents.

Competitive $Cs^+$—$Na^+$ and $Sr^{2+}$—$Na^+$ ion exchange experiments revealed high selectivity of KMS-2 for $Cs^+$ or $Sr^{2+}$. This is apparent when looking the distribution coefficient values of cesium or strontium being much higher than those of sodium. This selectivity of KMS-2 for $Cs^+$ or $Sr^{2+}$ against $Na^+$ is highly desired for nuclear waste remediation, since the waste water usually contains very high $Na^+$ concentrations.

To understand the nature of the pH effect on KMS-2 ion-exchange capability, the distribution coefficients were determined for KMS-2 with $Cs^+$ and $Sr^{2+}$ at the external pH stability range for the media (pH 3 and 10). Samples of the target elements were diluted to 6 ppm with solutions of the specific acidity and a V/m ratio of ~1000 mL/g was used. At a pH of 3 the $K_d$ values were still very good, especially for $Sr^{2+}$ ($6.33 \times 10^4$ mL/g). For $Cs^+$ the $K_d$ was slightly lower than that of the neutral system ($8 \times 10^3$ mL/g) but still good ($1.18 \times 10^3$ mL/g). Interestingly enough, the distribution coefficients for KMS-2 at a pH of 10 ($4.56 \times 10^3$ ($Cs^+$), $1.45 \times 10^5$ ($Sr^{2+}$) mL/g) were all summarily higher than those for pH of 3 and follow the general KMS-2 trend $Sr^{2+} > Cs^+$.

The compounds $A_{2x}M_xSn_{3-x}S_6$ (x=0.5-0.95; A=$Li^+$, $Na^+$, $K^+$, $Rb^+$; M=$Mg^{2+}$, $Mn^{2+}$, $Zn^{2+}$, $Fe^{2+}$) display a capacity for exchange with soft heavy metal ions like $Hg^{2+}$, $Pb^{2+}$, $Cd^{2+}$. We will describe results for $K_{2x}Mg_xSn_{3-x}S_6$ (x=0.5-0.95, KMS-2) compound. EDS and ICP-MS data for the exchanged materials confirmed the complete removal of $K^+$ ions and the presence of the heavy metal ions.

Figure 4:
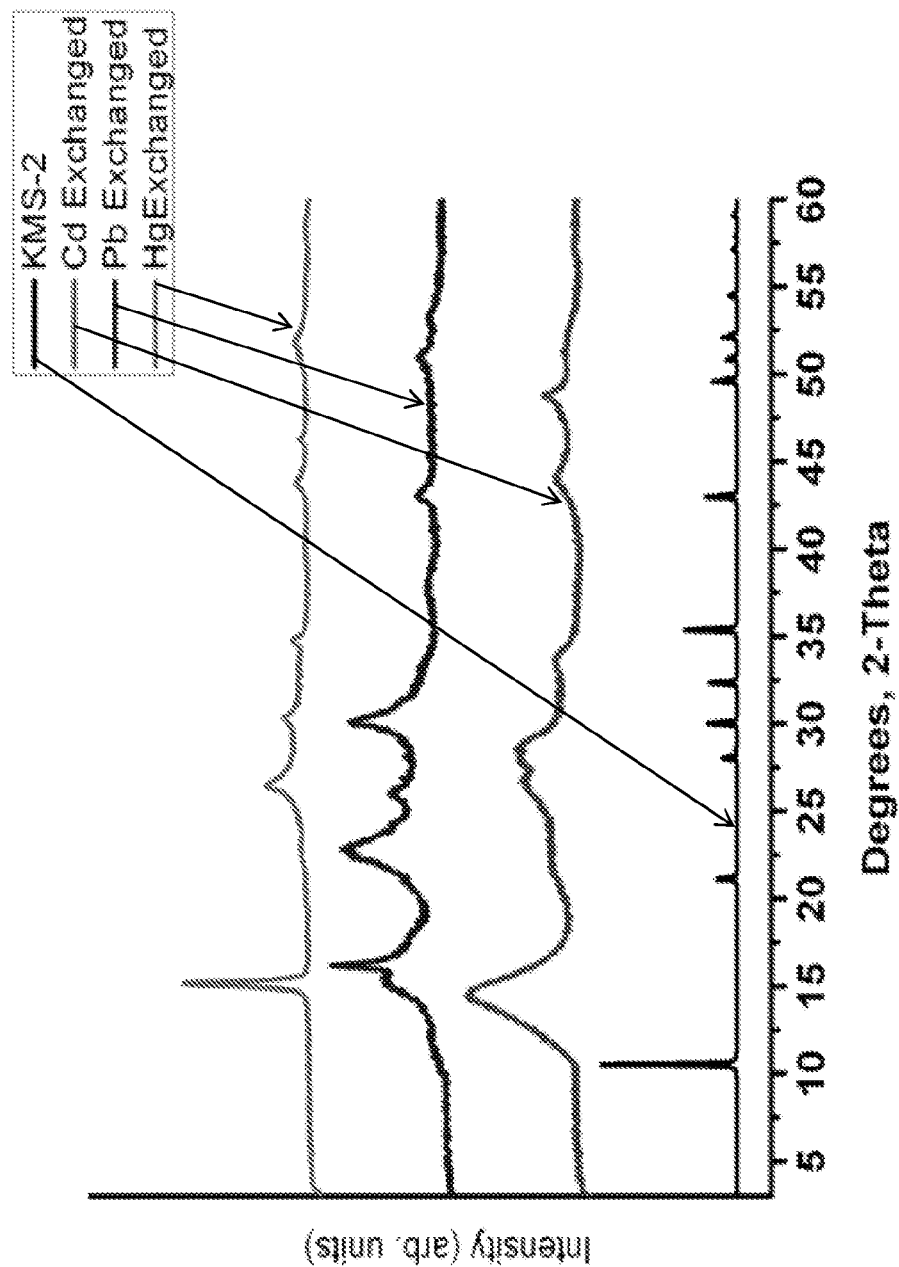
FIG. 4. Powder X-ray diffraction pattern of heavy metal exchanged KMS-2.

PXRD data are given in FIG. 4. Although $Hg^{2+}$ and $Pb^{2+}$ replace only the interlayer $K^+$ ions, the $Cd^{2+}$ exchanges also the intra-layer $Mg^{2+}$ besides the $K^+$ ions. The exchange of magnesium by cadmium was confirmed by EDS analysis on the solid after the ion-exchange process. In fact, the sharp peaks observed on the original KMS-2 compounds can broaden and shift, suggesting that some of the long range order in the crystalline solid is being lost. The expected powder patterns would show shifts of the layered peaks (002), (004) to higher 2-theta, as all of the tested heavy metals ions would be smaller than the $K^+$ ion. The contraction of the interlayer distances (seen in the d spacing) is also consistent with the strong covalent interactions between the layers and the heavy metal ions.

Figure 5:
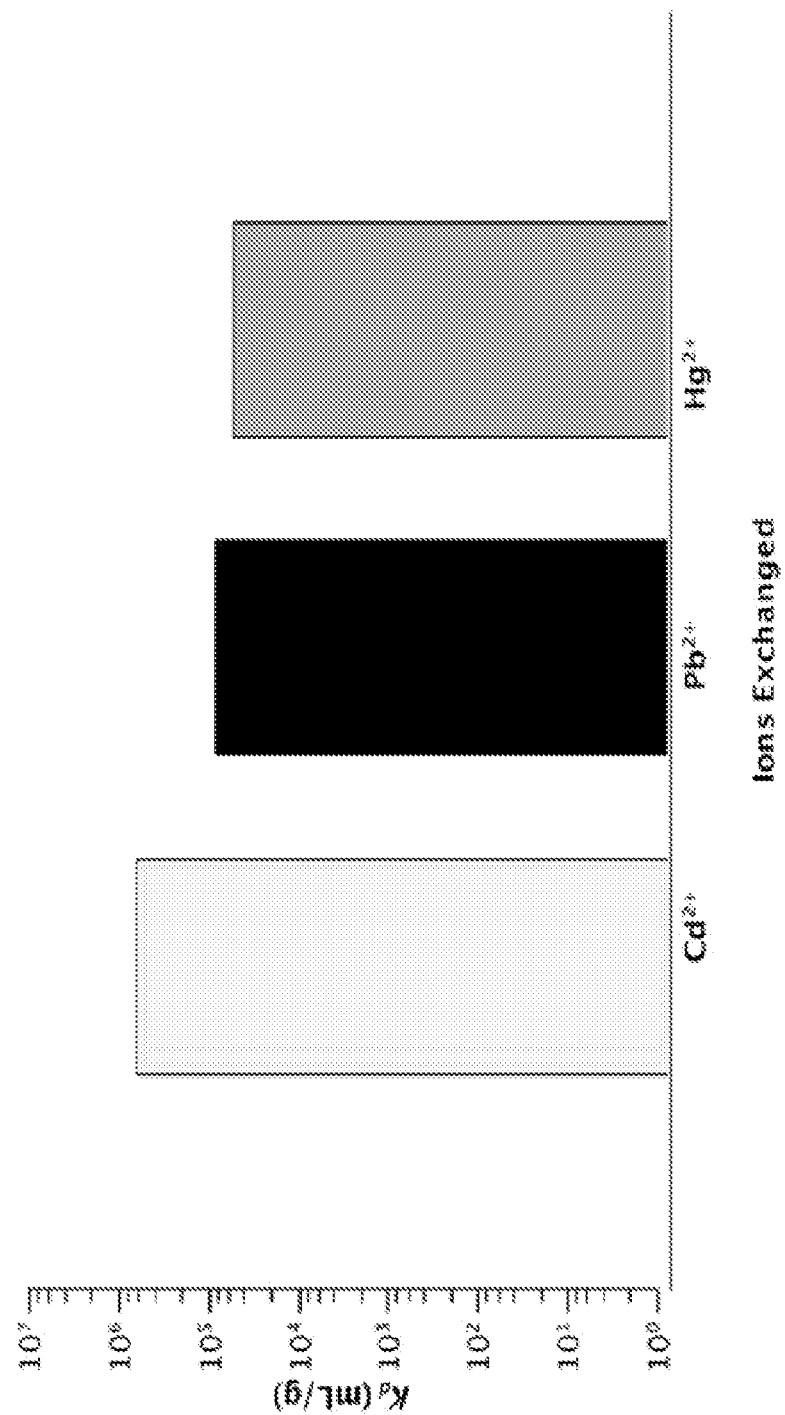
FIG. 5. Individual ion exchange reactions of KMS-2 at pH ~7. The $K_d$ values for each ion are: $6.28 \times 10^5$ mL/g ($Cd^{2+}$), $8.26 \times 10^4$ mL/g ($Pb^{2+}$), $5.35 \times 10^4$ mL/g ($Hg^{2+}$). $C_0$ ~1 ppm. V/m ~1000 mL/g.

Reactions were run individually to get the absolute distribution coefficient for each ion. To determine the selectivity and affinity for one ion over the other, the ions were run in competitive reactions (V/m=1000, pH ~7) where approximately 1 ppm of each ion $Hg^{2+}$, $Pb^{2+}$ and $Cd^{2+}$ was placed into solution. The individual reactions were very successful with KMS-2. The removal of ions by KMS-2 follows the trend: $K_dCd > K_dPb > K_dHg$. The removal of $Cd^{2+}$ ions from solution was the highest with over 99.8% removal and a $K_d$ of $6.28 \times 10^5$ mL/g. $Pb^{2+}$ remediation followed with >98.5% removal and a $K_d$ of $8.26 \times 10^4$ mL/g. $Hg^{2+}$ performed the worst individually with ~97.5% removal and a $K_d$ of $5.35 \times 10^4$ mL/g. The values are summarized in Table 2 and FIG. 5.

TABLE 2

Individual and competitive ion exchange of $Cd^{2+}$, $Pb^{2+}$ and $Hg^{2+}$ by KMS-2.

| Ions of Interest | V/m (mL/g) | $C_0$ (ppb) | $C_f$ (ppb) | % Removal | $K_d$ (mL/g) |
|---|---|---|---|---|---|
| Individual Reactions ||||||
| $Cd^{2+}$ | 990 | 963 | 1.2-1.8 | >99.8 | $6.28 \times 10^5$ |
| $Pb^{2+}$ | 993 | 884 | 8.9-12.9 | >98.5 | $8.26 \times 10^4$ |
| $Hg^{2+}$ | 983 | 707 | 12.9-17.2 | 97.5-98.2 | $5.35 \times 10^4$ |
| Competitive Reactions ||||||
| $Cd^{2+}$ | 1003 | 939 | 0.7-1.0 | >99.9 | $1.07 \times 10^6$ |
| $Pb^{2+}$ | 1003 | 909 | 1.8-3.6 | 99.6-99.8 | $3.78 \times 10^5$ |
| $Hg^{2+}$ | 1003 | 709 | 12.9-14.9 | 97.8-98.2 | $5.14 \times 10^4$ | a. Samples were prepared in triplicate and average is reported here.

Figure 6:
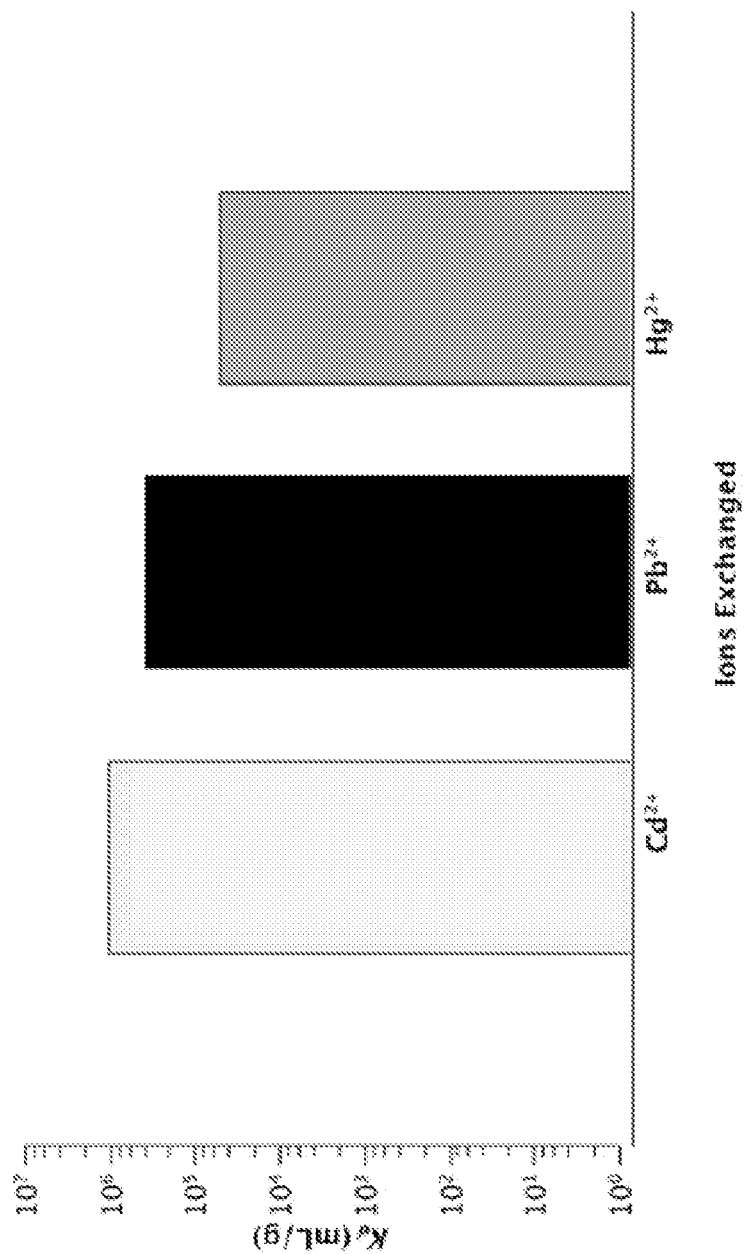
FIG. 6. Competitive ion exchange reactions of KMS-2 at pH ~7. The $K_d$ values for each ion are: $1.07 \times 10^6$ mL/g ($Cd^{2+}$), $3.78 \times 10^5$ mL/g ($Pb^{2+}$), $5.14 \times 10^4$ mL/g ($Hg^{2+}$). $C_0$ ~1 ppm. V/m ~1000 mL/g.

Competitive reactions between $Hg^{2+}$, $Pb^{2+}$ and $Cd^{2+}$ were used to determine the affinity and selectivity in a competitive environment with similar ions (FIG. 6). The distribution coefficients surprisingly increased to $1.07 \times 10^6$ mL/g (competitive) from $6.28 \times 10^5$ mL/g (individual) for $Cd^{2+}$ and to $3.78 \times 10^5$ mL/g (competitive) from $8.26 \times 10^4$ mL/g (individual) $Pb^{2+}$. Understandably, the $Hg^{2+}$ $K_d$ decreased in the competitive case from $5.35 \times 10^4$ mL/g to $5.14 \times 10^4$ mL/g. One possible cause for the increase of Kd's of $Pb^{2+}$ and $Cd^{2+}$ is that the competition creates a cooperative effect. A cooperative effect may happen when ions of different sizes enter between the layers. The interlayer may be increased or decreased resulting in a change of sorption. This phenomenon may exist because of the size discrepancies between the ions ($Pb^{2+} > Hg^{2+} > Cd^{2+}$). The preference of KMS-2 for heavy metals (at 1 ppm) is: $Cd^{2+} > Pb^{2+} > Hg^{2+}$. This material compares well with KMS-2.

Figure 7:
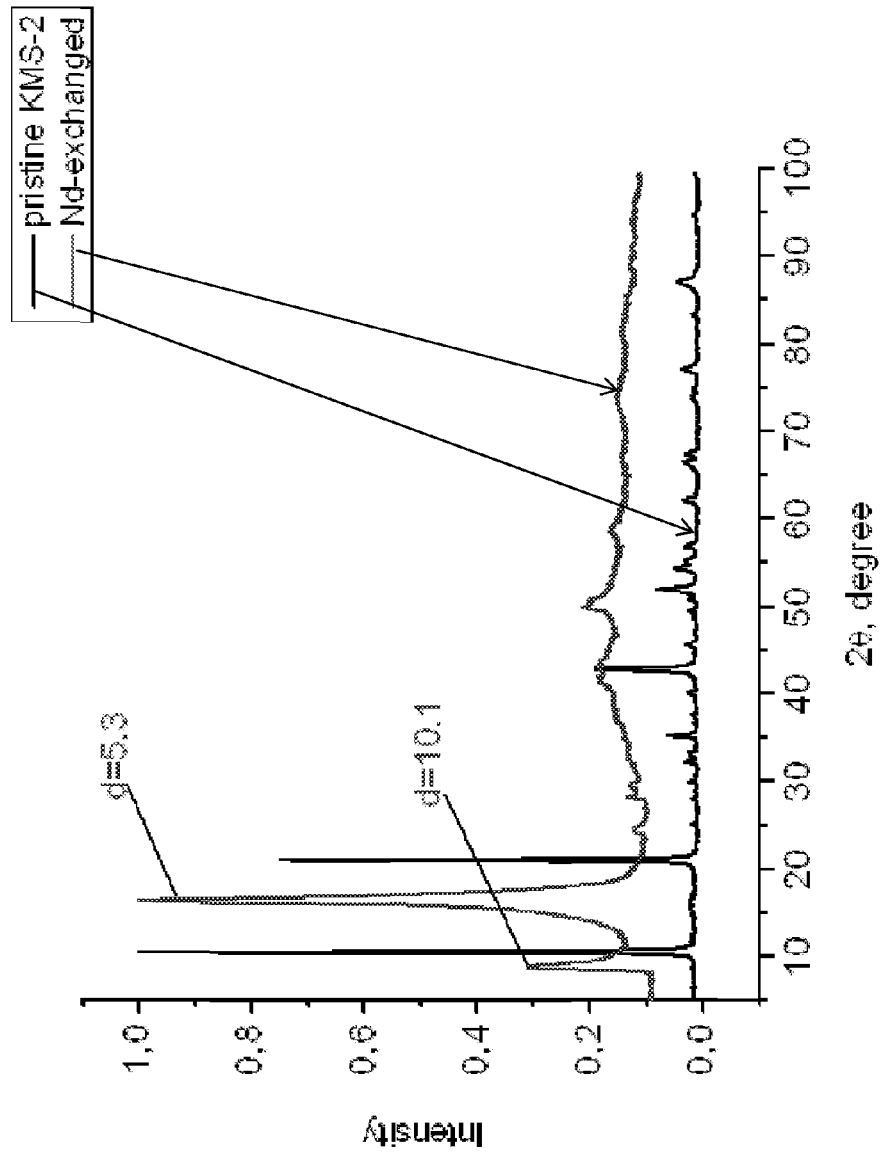
FIG. 7. Powder X-ray diffraction pattern of pristine KMS-2 and $Nd^{3+}$-exchanged KMS-2.

The compounds $A_{2x}M_xSn_{3-x}S_6$ (x=0.5-0.95; A=$Li^+$, $Na^+$, $K^+$, $Rb^+$; M=$Mg^{2+}$, $Mn^{2+}$, $Zn^{2+}$, $Fe^{2+}$) display a capacity for exchange with toxic heavy metal ions like $Cr^{6+}$, $Nd^{3+}$. We will describe results for $K_{2x}Mg_xSn_{3-x}S_6$ (x=0.5-0.95, KMS-2) compound. EDS and PXRD data for the exchanged materials confirmed the removal of $K^+$ ions and the presence of the heavy metal ions (Table 3, FIG. 7).

TABLE 3

Selected data for $K_{2x}Mg_xSn_{3-x}S_6$ (x = 0.5-0.95, KMS-2) and its $Cr^{6+}$ and $Nd^{3+}$ exchanged analogues.

| KMS-2 Ion Exchange w/Given Ions | Nominal Composition | Measured Composition |
|---|---|---|
| KMS-2 | $K_2MgSn_2S_6$ | $K_{1.8}Mg_{0.8}Sn_{2.02}S_{5.8}$ |
| $Cr^{6+}$ | $Cr_{0.33}MgSn_2S_6$ | $K_1Cr_{0.06}Mg_{0.7}Sn_{2.3}S_{5.7}$ |
| $Nd^{3+}$ | $Nd_{0.66}MgSn_2S_6$ | $Nd_{0.6}Mg_{0.7}Sn_{2.4}S_{6.2}$ |

Figure 8:
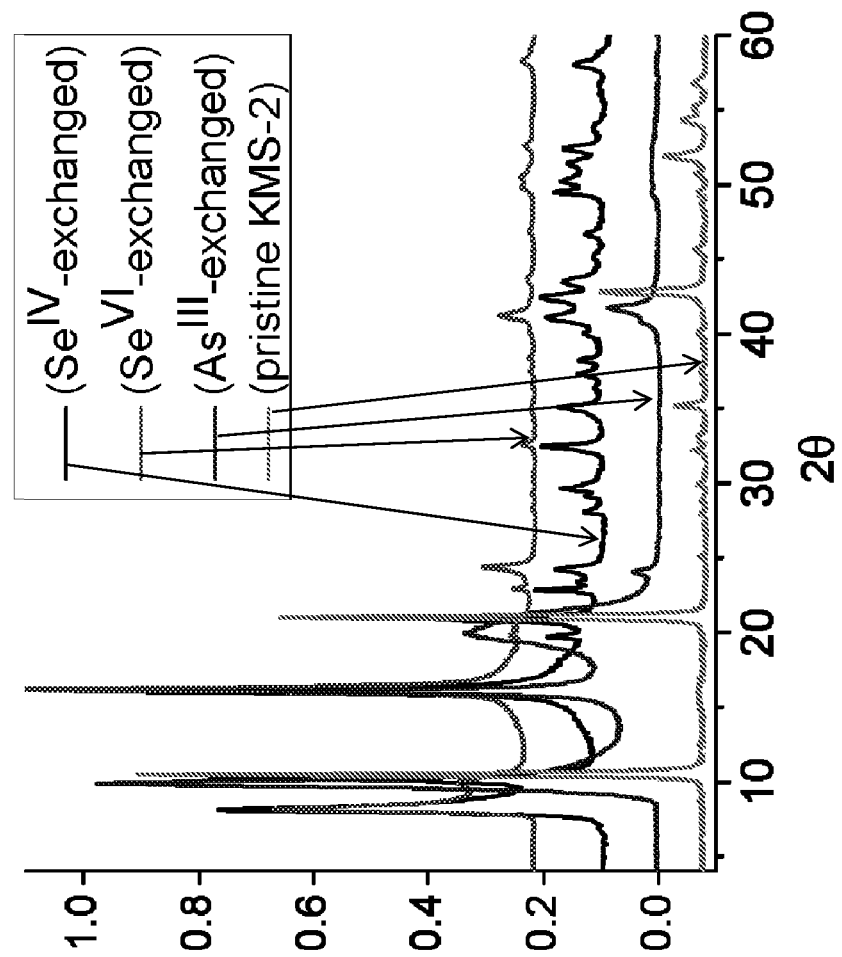
FIG. 8. Powder X-ray diffraction pattern s for pristine KMS-2, $As^{3+}$, $Se^{4+}$, and $Se^{6+}$-exchanged material.

The compounds $A_{2x}M_xSn_{3-x}S_6$ (x=0.5-0.95; A=$Li^+$, $Na^+$, $Rb^+$; M=$Mg^{2+}$, $Mn^{2+}$, $Zn^{2+}$, $Fe^{2+}$) display a capacity for exchange with arsenite, arsenate, selenite and selenate. We will describe results for $K_{2x}Mg_xSn_{3-x}S_6$ (x=0.5-0.95, KMS-2) compound. EDS, PXRD and ICP-MS data for the exchanged materials confirmed the partially removal of $K^+$ ions and the presence of the heavy metal ions (Table 4, 5 and FIG. 8).

TABLE 4

Selected data for $K_{2x}Mg_xSn_{3-x}S_6$ (x = 0.5-0.95, KMS-2) and its $As^{3+}$ and $Se^{4+}$ exchanged analogues.

| KMS-2 Ion Exchange w/Given Ions | Nominal Composition | Measured Composition |
|---|---|---|
| KMS-2 | $K_2MgSn_2S_6$ | $K_{1.8}Mg_{0.8}Sn_{2.02}S_{5.8}$ |
| $As^{3+}$ | $As_{0.66}MgSn_2S_6$ | $Na_{0.88}As_{0.07}Mg_{0.8}Sn_{2.5}S_{5.7}$ |
| $Se^{4+}$ | $Se_{0.5}MgSn_2S_6$ | $Se_{0.4}Mg_{1.4}Sn_{2.4}S_{5.8}$ |

TABLE 5

ICP-MS results for selenite and selenate removal by KMS-2.

| V/m mL/g | $[Se^{4+}]_0$ ppm | $[Se^{6+}]_0$ ppm | $[Se^{4+}]_f$ ppm | $[Se^{6+}]_f$ ppm | % removal Se4+ | % removal Se6+ | $K_d^{Selenite}$ mg/L | $K_d^{selenate}$ mg/L | $q_{selenite}$ mg/g | $q_{selenate}$ mg/g |
|---|---|---|---|---|---|---|---|---|---|---|
| 7416 | 14.82 | N/A | 13.33 | N/A | 10.1 | N/A | 8.28E+02 | N/A | 11.04 | N/A |
| 4944 | N/A | 17.78 | N/A | 16.75 | N/A | 5.8 | N/A | 3.04E+02 | N/A | 5.09 | a. Samples were prepared in triplicate and average is reported here.

Figure 9:
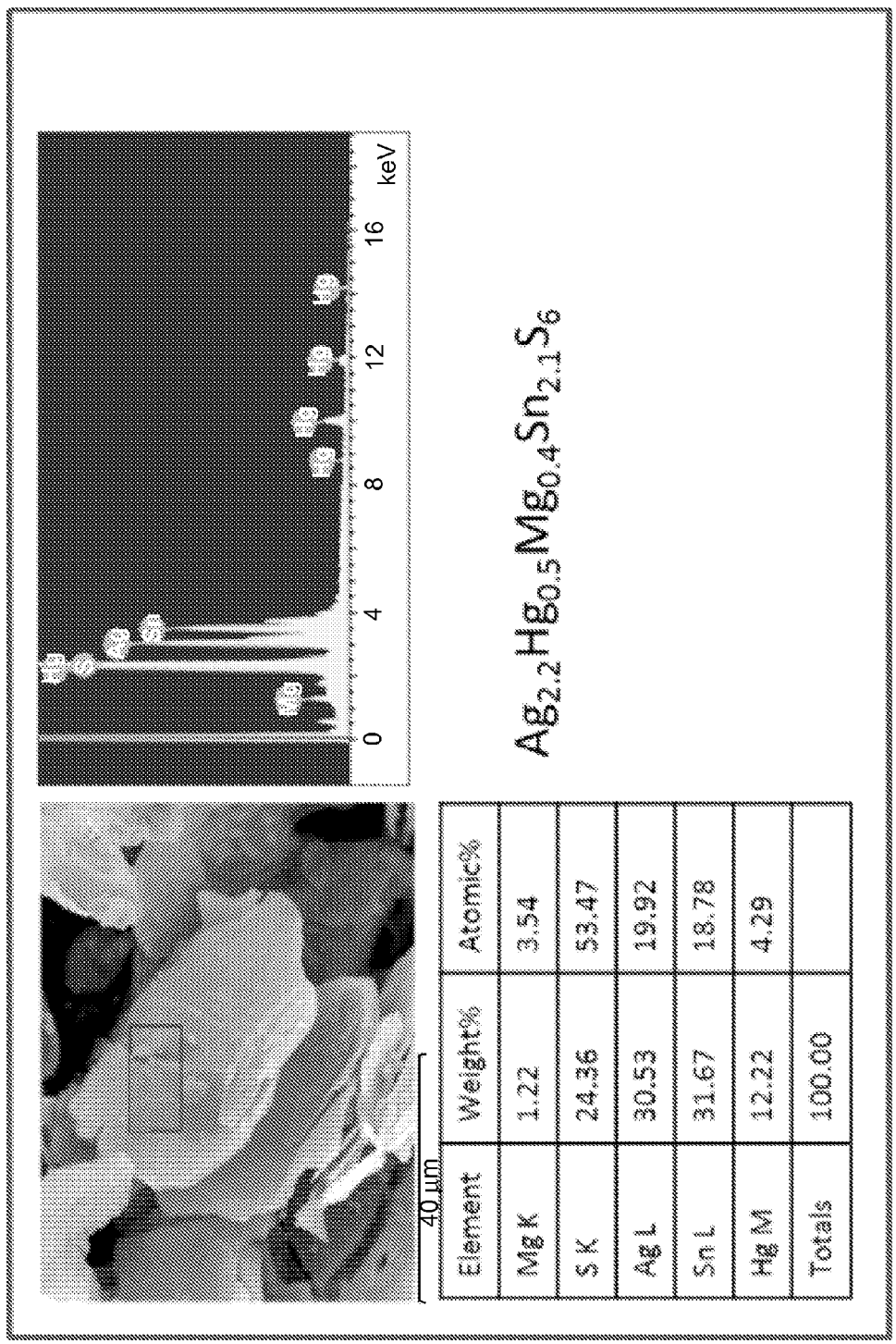
FIG. 9. SEM/EDS analyses for $Hg^{2+}$ and $Ag^+$-exchanged KMS-2.
Figure 10:
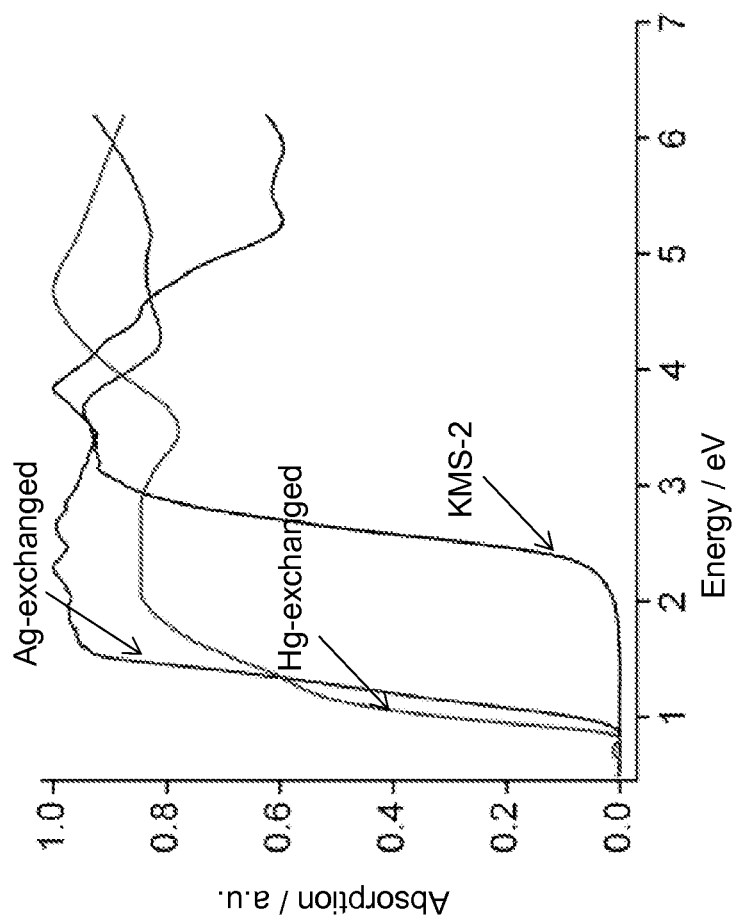
FIG. 10. UV-Vis analyses of pristine KMS-2, $Hg^{2+}$ and $Ag^+$-exchanged KMS-2.

The compounds $A_{2x}M_xSn_{3-x}S_6$ (x=0.5-0.95; A=Li$^+$, Na$^+$, Rb$^+$; M=Mg$^{2+}$, Mn$^{2+}$, Zn$^{2+}$, Fe$^{2+}$) display a capability to uptake heavy metal ions like Ag$^+$ and Hg$^{2+}$ from their cyanide complexes. We will describe results for $K_{2x}Mg_xSn_{3-x}S_6$ (x=0.5-0.95, KMS-2) compound. EDS, UV-Vis, PXRD and ICP-MS data for the exchanged materials confirmed the complete removal of the K+ and replacement of the heavy metal ions (FIGS. 9 and 10).

Figure 11:
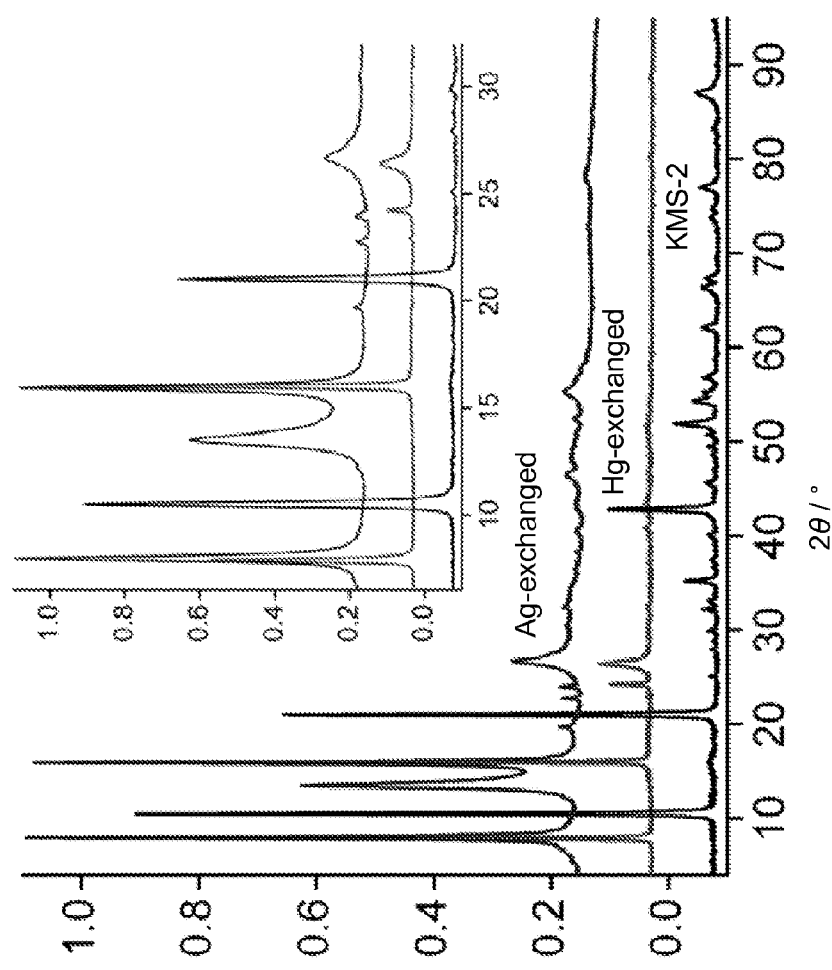
FIG. 11. Powder X-ray diffraction pattern s for pristine KMS-2, and $Ag^+$, and $Hg^{2+}$-exchanged materials.
Figure 12B:
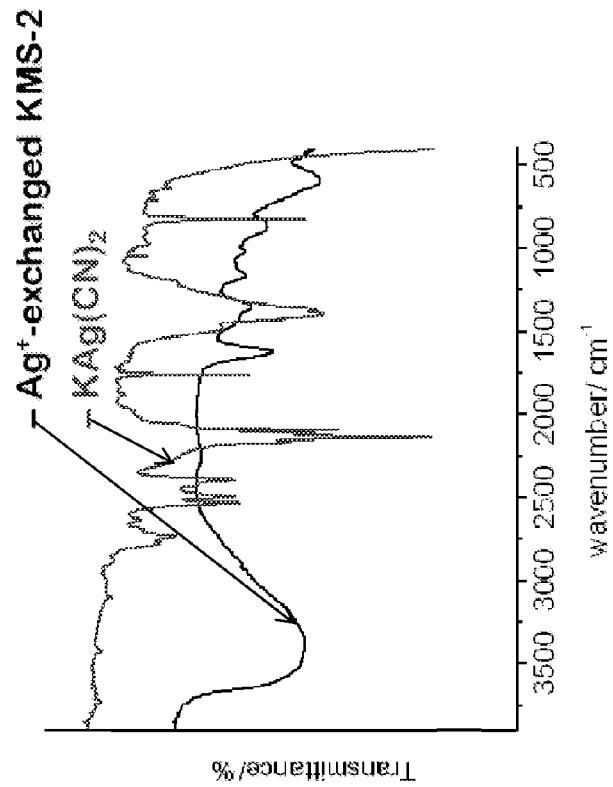
FIG. 12(B). Mid-IR spectrum of the pristine $K_2Hg(CN)_4$, $Ag^+$-exchanged KMS-2.
Figure 12A:
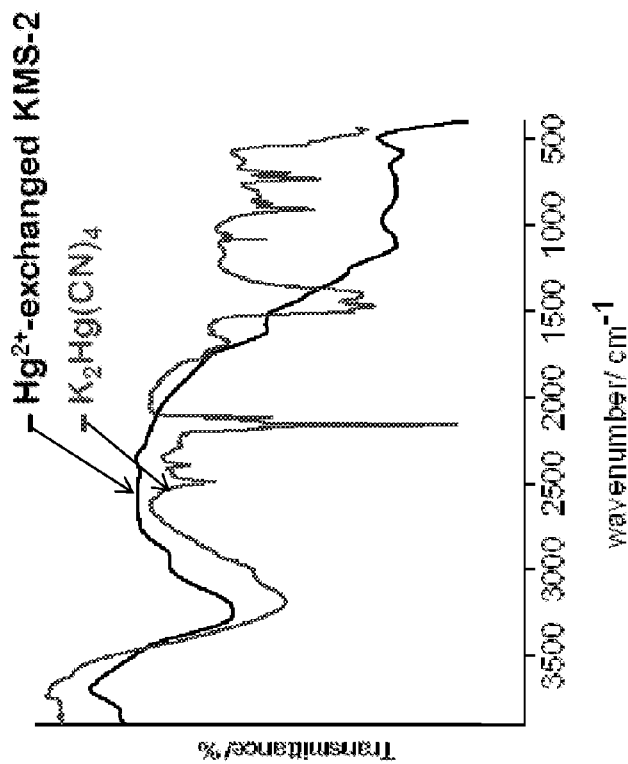
FIG. 12(A). Mid-IR spectrum of the pristine $K_2Hg(CN)_4$, $Hg^{2+}$-exchanged KMS-2, $KAg(CN)_2$.

Powder X-ray diffraction (PXRD) of the Ag$^+$ and Hg$^{2+}$-exchanged materials showed that they are isostructural with the pristine KMS-2 confirming a topotactic ion exchange. A shift of the (002) and (004) Bragg peaks to lower 2θ value (higher d-spacing) in Hg$^{2+}$-exchanged KMS-2 revealed an expansion of the interlayer distance (from 8.42 to 11.23 Å). Both expansion and contraction of the interlayer distance (from 8.42 to 11.09 and to 6.56 Å) have been observed in Ag$^+$-exchanged KMS-2 (FIG. 11). However, the presence of any type of positive charged complexes e.g. Hg(CN)$^+$ and Ag$_2$(CN)$^+$ between the layers can be excluded, at least on the IR, as CN bond never observed (FIGS. 12(A) and 12(B)).

To evaluate the selectivity of KMS-2 to remove Ag$^+$ and Hg$^{2+}$ from their cyanide complexes we performed competitive ion exchange studies using the batch method at pH ~10 (mimicking the mining waste pH). At molar ratio of Hg$^{2+}$:Ag$^+$:KMS-2 1:2:1, absorption of the Hg$^{2+}$ and Ag$^+$ occurred even in much higher initial concentrations of these cations (above ~97% of both ions have been adsorbed), because of the partially replacement of the Mg$^{2+}$ with the exchanged ions. Considering Mg$^{2+}$ as an additional exchangeable site, a series of ion-exchange experiments have been performed using the molar ratio of Hg$^{2+}$:Ag$^+$:KMS-2 2:4:1. These experiments revealed that KMS-2 is more selective toward absorbing Hg$^{2+}$ that Ag$^+$ (77% removal for Hg and 37% for Ag). Results are tabulated in Table 6.

TABLE 6

ICP-MS results for competitive ion-exchange of KMS-2 with $K_2Hg(CN)_4$ and $KAg(CN)_2$ at pH of 10.

| KMS:Ag:Hg eq | V/m mL/g | $[Ag]_0$ ppm | $[Hg]_0$ ppm | $[Ag]_f$ ppm | $[Hg]_f$ ppm | % removal Ag | % removal Hg | $K_d^{Ag}$ mg/L | $K_d^{Hg}$ mg/L | $q_{Ag}$ mg/g | $q_{Hg}$ mg/g |
|---|---|---|---|---|---|---|---|---|---|---|---|
| 1:2:1 | 10000 | 41.98 | 28.36 | 1.13 | 0.46 | 97.29 | 98.4 | 3.60E+05 | 6.05E+05 | 408.46 | 279.05 |
| 1:2:2 | 14800 | 28.36 | 51.02 | 3.88 | 0.68 | 86.29 | 98.6 | 9.32E+04 | 1.09E+06 | 362.28 | 744.88 |
| 1:4:1 | 15200 | 55.24 | 24.84 | 13.58 | 0.89 | 75.41 | 96.4 | 4.66E+04 | 4.07E+05 | 633.18 | 363.91 |
| 1:4:2 | 2000 | 382.3 | 382.63 | 146.28 | 86.55 | 37.0 | 77.4 | 1.18E+03 | 6.84E+03 | 283.20 | 592.16 |
| 1:4:4 | 3000 | 254.86 | 510.18 | 130.03 | 188.8 | 31.1 | 63.0 | 1.36E+03 | 5.11E+03 | 238.10 | 964.14 |
| 1:8:2 | 3000 | 509.73 | 255.09 | 130.03 | 81.54 | 21.9 | 68.0 | 8.43E+02 | 6.39E+03 | 335.50 | 520.65 |

Figure 13:
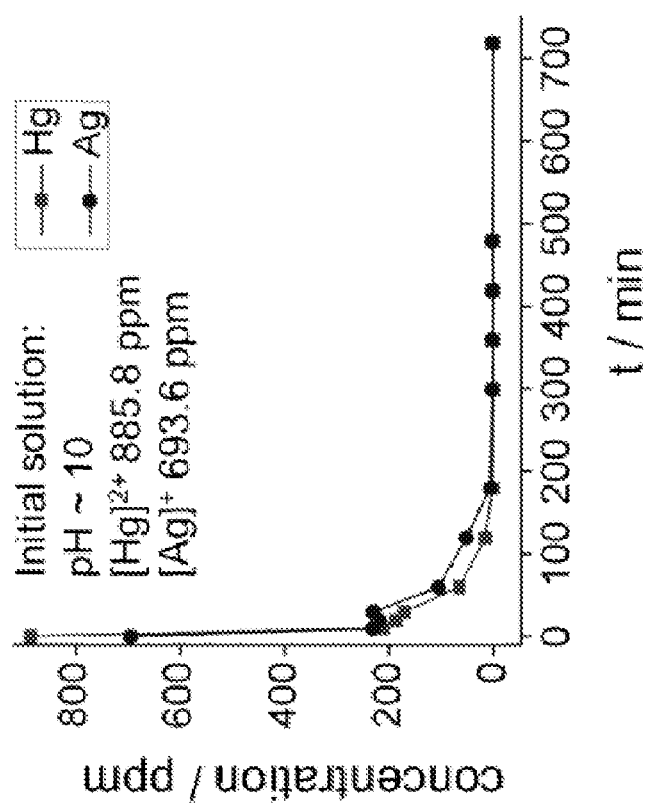
FIG. 13. Kinetics for absorbing $Ag^+$ and $Hg^{2+}$ from their cyanide complexes by KMS-2.

To fully study the ion exchange behavior of the KMS-2, we investigated the kinetics of the Ag$^+$ and Hg$^{2+}$ ion exchange using the batch method. The ion exchange studies have been performed at pH ~10 in order to mimic the mining waste conditions. The initial and final concentrations of the metal ions were determined by ICP-MS. The maximum initial concentrations of the ions used were just high enough to saturate the exchanged sites of KMS-2. Within ~3 hours of the solution/KMS-2 contact, Ag$^+$ and Hg$^{2+}$ exchange reached their equilibrium with more than 99.9% of their initial amounts removed from the solution (FIG. 13). The high mobility of the interlayer K$^+$ ions and the high affinity of the soft basic framework for soft Lewis acids can be considered as the main reasons for the fast Ag$^+$ and Hg$^{2+}$ removals.

Figure 14:
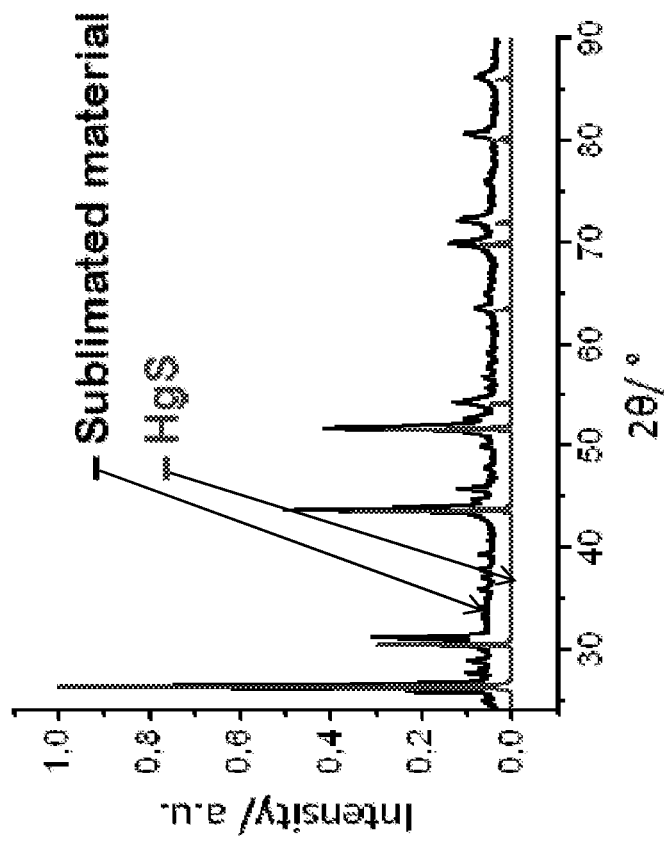
FIG. 14. Powder X-ray diffraction pattern s for HgS and the sublimated $Hg^{2+}$ and $Ag^+$-loaded KMS-2.
Figure 15:
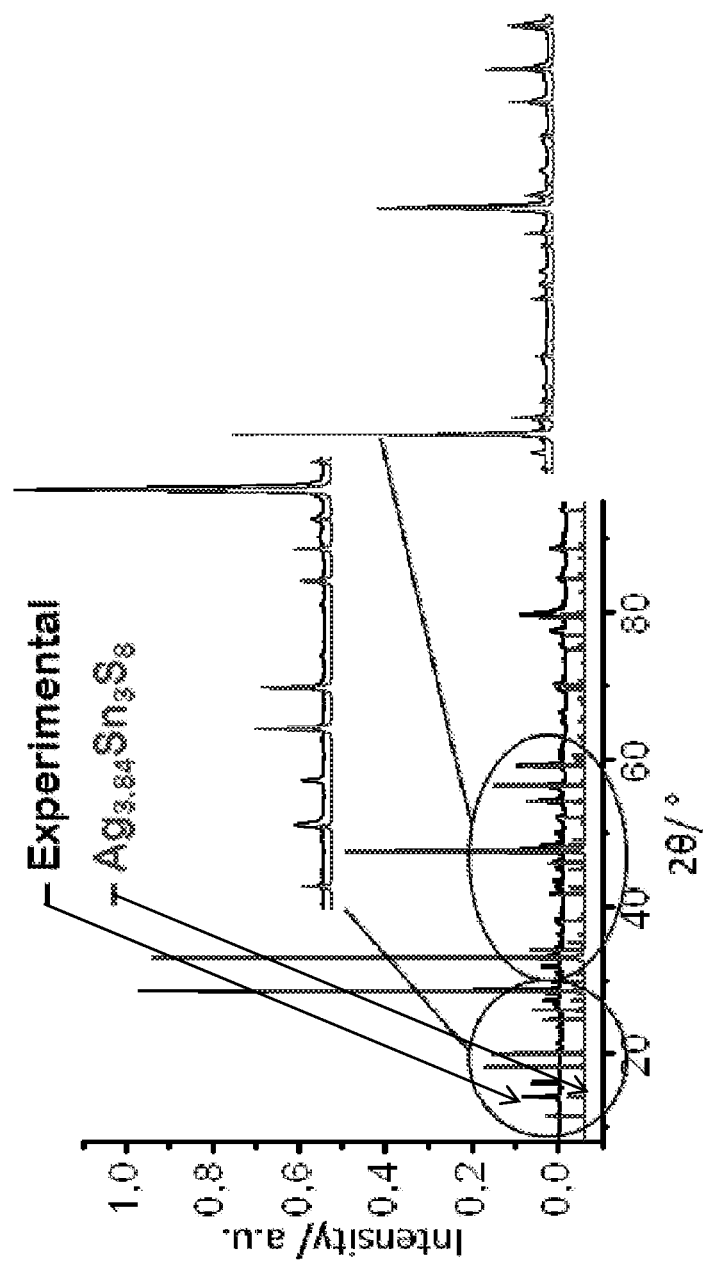
FIG. 15. Powder X-ray diffraction pattern s for simulated and experimental $Ag_{3.84}Sn_3S_8$.
Figure 16:
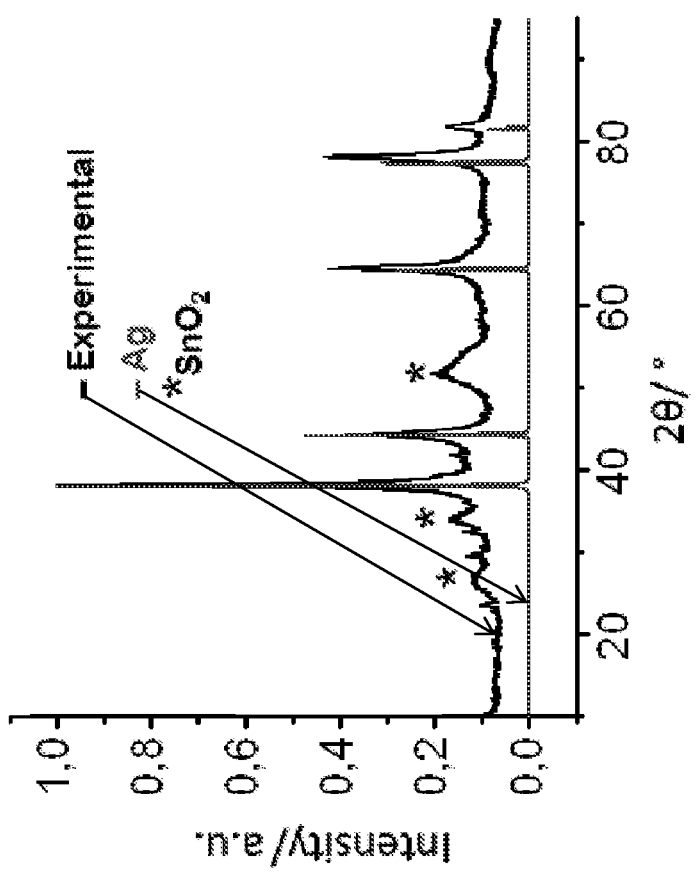
FIG. 16. Powder X-ray diffraction pattern s for $Ag^0$ and the recovered $Ag^0$ from $Ag_{3.84}Sn_3S_8$ phase.

In order to recover the elemental Ag from the Ag$^+$ and Hg$^{2+}$-loaded KMS-2, the exchanged material was heated over 450° C. for 48 h. Hg was sublimated and analyzed by EDS and powder X-ray diffraction to be HgS at the top end of the tube which was placed outside of the furnace. The structure of the residue was confirmed to be a known phase of $Ag_{3.84}Sn_3S_8$ based on PXRD and EDS analyses (FIGS. 14 and 15). Elemental Ag was then recovered from this residue by dissolving it in acid and reducing the $Ag^+$ to $Ag^0$ (FIG. 16).

High tendency of S atoms to bind with heavy metal ions may act as a driving force to further dissociate the cyanide complexes, therefore, the adsorption characteristics of the $Ag^+$ and $Hg^{2+}$ remained unchanged compared to that of the metal only systems. This is of importance due to either further recovery of the precious metals such as Ag or removal of the toxic heavy metals such as Hg from the waste waters towards purification of the water.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

We present new synthetic method for the preparation of $K_{2x}Mg_xSn_{3-x}S_6$ (x=0.5-0.95). Similar procedures can be followed for synthesis of other members of the families of materials $A_{2x}M_xSn_{3-x}S_6$ (x=0.5-0.95; A=$Li^+$, $Na^+$, $K^+$, $Rb^+$; M=$Mg^{2+}$, $Mn^{2+}$, $Zn^{2+}$, $Fe^{2+}$).

Synthesis of $K_{2x}Mg_xSn_{3-x}S_6$ (x=0.5-0.95, KMS-2)

A) Solid state synthesis (i): $K_2CO_3$ (0.1878 mol, 25.963 g), Mg (0.1878 mol, 4.566 g), Sn (0.3757 mol, 44.599 g) and S (1.1896 mol, 38.147 g) were combined and loaded in a 250 mL grinding jar under nitrogen atmosphere in a glovebox. The mixture was ball-milled at 100 rpm for 1 minute and at 250 rpm for 30 minutes. 50 g of the ball-milled material was placed in a large quartz tube under $N_2$ atmosphere. A secured balloon was attached at the end of the reaction tube in order to absorb the created pressure of the $CO_2$ evolution. The mixture was heated gradually to 200° C. where it was kept for 5 h before being successfully brought to 850° C. for 8 h. Well-formed yellow plate-shaped crystals were obtained by air quenching. The material was washed with $H_2O$ to remove any unreacted material and soluble by-products, and then with acetone (~60-65% yield based on the total mass). The empirical formula for the product of the solid state reaction determined by single crystal diffraction measurements was $K_{1.38}Mg_{0.69}Sn_{1.31}S_4$.

Figure 17:
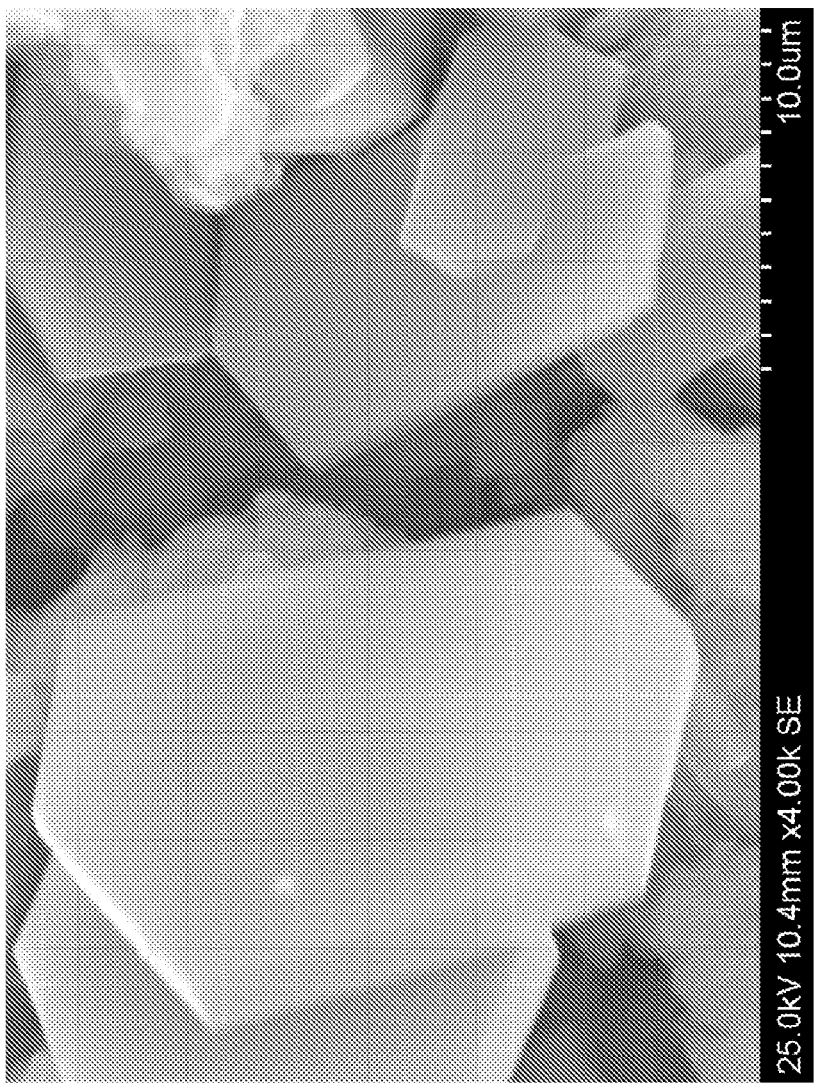
FIG. 17. SEM picture of the hydrothermally synthesized KMS-2.

B) Hydrothermal synthesis (ii): $K_2CO_3$ (0.1878 mol, 25.963 g), Mg (0.1878 mol, 4.566 g), Sn (0.3757 mol, 44.599 g) and S (1.1896 mol, 38.147 g) were combined and loaded in a 250 mL grinding jar under nitrogen atmosphere in a glovebox. The mixture was ball-milled at 100 rpm for 1 minute and at 250 rpm for 30 minutes. The ball-milled material was placed into a glass beaker and water was added drop wisely while stirring under air until it became like dough. Reaction is highly exothermic, care should be taken. The pre-reacted material was placed into a large Teflon-lined stainless steel Autoclave. The autoclave was kept in an oven at about 220° C. for 4 h. The products were isolated in air by soaking in water, filtration and washed with deionized water, ethanol and acetone. Under microscopic observation, the product consisted of yellow hexagonal plate-like crystals (FIG. 17). The yield was about 80-90% based on the total mass.

Ion-Exchange Studies.

The $Cs^+$, $Sr^{2+}$, $Hg^{2+}$, $Pb^{2+}$, $Cd^{2+}$, $Ag^+$, $Cr^{6+}$, $Nd^{3+}$, $As^{3+}$, $As^{5+}$, $Se^{4+}$ and $Se^{6+}$ uptake from solutions of various concentrations were studied by the batch method at a volume to mass ratio of about 1000 mL/g, room temperature and 12-15 h contact time.

The distribution coefficient $K_d$, used for the determination of the affinity and selectivity of materials for $Cs^+$, $Sr^{2+}$, $Hg^{2+}$, $Pb^{2+}$, $Cd^{2+}$, $Ag^+$, $Se^{4+}$ and $Se^{6+}$ is given by the equation:

$$K_d = \frac{V[(C_0 - C_f)/C_f]}{m};$$

where $C_o$ and $C_f$ are the initial and equilibrium concentration of $M^{n+}$ (ppm), V is the volume (ml) of the testing solution and m is the amount of the ion exchanger (g) used in the experiment.

Physical Measurements.

Powder patterns were obtained using a CPS 120 INEL X-ray powder diffractometer with Ni-filtered Cu Kα radiation operating at 40 kV and 20 mA and equipped with a position-sensitive detector. Samples were ground and spread on a glass slide.

Powders were imaged by a scanning electron microscope (SEM) and the relative atomic composition was determined with energy dispersive spectroscopy (EDS). A Hitachi S-3400N-II system was used with 25.0 kV acceleration voltages, a 60 s acquisition time and the ESED II detector for elemental analysis. Carbon and oxygen content from EDS data were excluded from the calculation of relative elemental composition ratios for accuracy.

$Cs^+$, $Sr^{2+}$, $Hg^{2+}$, $Pb^{2+}$, $Cd^{2+}$, $Ag^+$, $Se^{4+}$ and $Se^{6+}$ were analyzed with Inductively Coupled Plasma-Mass Spectroscopy (ICP-MS) using a computer-controlled Thermo Elemental (Waltham, Mass.) PQ ExCell Inductively Coupled Plasma Mass Spectrometer with a quadruple setup. Ten standards of the various cations in the range of 1-40 ppb were prepared by diluting commercial (Aldrich or GFS chemical) about 1000 ppm solutions of these cations. The samples were diluted to lower the concentrations below than 40 ppb. All samples (including standards) were prepared in a 5% nitric acid solution with 1 ppb 153Eu internal standard in order to correct for instrumental drift and matrix effects during analysis.

Infrared spectra (IR) in the mid-IR region [4000–400 $cm^{-1}$, Diffuse Reflectance Infrared Fourier Transform (DRIFT) method] were recorded with a computer-controlled Nicolet 750 Magna-IR series II spectrometer equipped with a TGS/PE detector and silicon beam splitter in 2-$cm^{-1}$ resolution.

UV/vis/near-IR diffuse reflectance spectra were obtained at room temperature on a Shimadzu UV-3010 PC double beam, double monochromator spectrophotometer in the wavelength range of 200-2500 nm. BaSO4 powder was used as a reference (100% reflectance) and base material on which the powder sample was coated. The reflectance data were converted to absorption using the Kubelka-Munck function, and the band edge for each sample was estimated from the intercept of the line extrapolated from the high-energy end of the absorption to the baseline.

A Bruker APEX2 CCD diffractometer was used with a synchrotron radiation of 0.41328 Å operating at 293K was used for the data collection. Cell refinement, data reduction and numerical absorption correction were carried out using Bruker AXS suite program. The intensities were extracted by the program XPREP. The structures were solved with direct methods using SHELXS and least square refinement were done against $F_{obs2}$ using routines from SHELXTL software. Because of the large thermal displacement factors of the K atoms in the structure, the refinement of these atoms was restrained to achieve charge balance. This was carried out using the JANA crystallographic program.

C) Hydrothermal synthesis (iii): In this example, M (Mg) is provided in the form of a metal salt. $K_2CO_3$ (0.19 mol), $MgCl_2$ (or $MgCO_3$, $Mg(NO_3)_2$) (0.19 mol.), Sn (0.3757 mol.) and S (1.1896 mol.) were combined and loaded in a 250 mL grinding jar under nitrogen atmosphere in a glovebox. The mixture was ball-milled at 100 rpm for 1 min and at 250 rpm for 10 to 30 min. Alternatively the mixture can be mixed using a grinder. The mixture material was then placed into a glass beaker and water was added drop wisely while stirring under air until it became like dough. Reaction is highly exothermic, care should be taken. The pre-reacted material was placed into a large Teflon-lined stainless steel Autoclave. The autoclave was kept in an oven at about 200-220° C. for 2-4 h. The products were isolated in air by soaking in water, filtration and washed with deionized water, ethanol and acetone. Under microscopic observation, the product consisted of yellow hexagonal plate-like crystals in at least 80% yield.

While several, non-limiting examples have been illustrated and described, it should be understood that changes and modifications can be made therein in accordance with ordinary skill in the art without departing from the invention in its broader aspects as defined in the following claims.

What is claimed is:

1. A method for the synthesis of a compound of the formula $A_{2x}M_xSn_{3-x}S_6$, where x has a value in the range from 0.5 to 1; A is $Li^+$, $Na^+$, $K^+$, $Rb^+$ or $Cs^+$; and M is $Mg^{2+}$, $Ca^{2+}$, $Mn^{2+}$, $Zn^{2+}$, or $Fe^{2+}$, wherein the method is a solid state method comprising heating a reaction mixture of $A_2CO_3$, M, S and Sn to a temperature and for a time sufficient to produce the compound of the formula $A_{2x}M_xSn_{3-x}S_6$, via a solid state reaction.

2. The method of claim 1, wherein the reaction mixture consists of $A_2CO_3$, M, S and Sn.

3. The method of claim 1, wherein heating the reaction mixture comprises heating the mixture to a temperature of no greater than about 1000° C. for a time of no greater than about 15 hours and further wherein the method provides a yield of the compound having the formula $A_{2x}M_xSn_{3-x}S_6$ of at least about 50%, based on total mass.

4. The method of claim 1, further comprising ball milling the reaction mixture prior to heating.

5. The method of claim 1, wherein A is $K^+$ and M is $Mg^{2+}$.

6. A method comprising:
exposing a fluid sample comprising at least one of $Cr^{6+}$, $Nd^{3+}$, $As^{3+}$, $As^{5+}$, $Se^{4+}$, and $Se^{6+}$ ions to a chalcogenide compound having the formula $A_{2x}M_xSn_{3-x}S_6$, where x has a value in the range from 0.5 to 1; A is $Li^+$, $Na^+$, $K^+$, or $Rb^+$; and M is $Mg^{2+}$, $Ca^{2+}$, $Mn^{2+}$, $Zn^{2+}$, or $Fe^{2+}$, whereby the chalcogenide compound absorbs the ions; and removing the absorbed ions from the fluid sample.

* * * * *